July 7, 1936.   I. DE LA TEJA   2,046,552
INDICATOR
Filed April 16, 1934   4 Sheets-Sheet 1
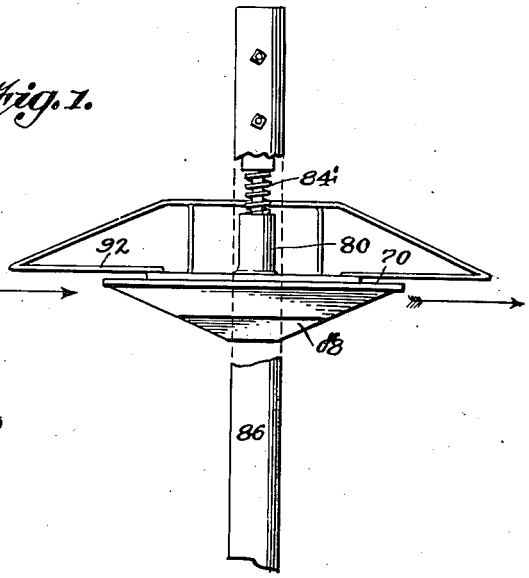
Fig. 1.
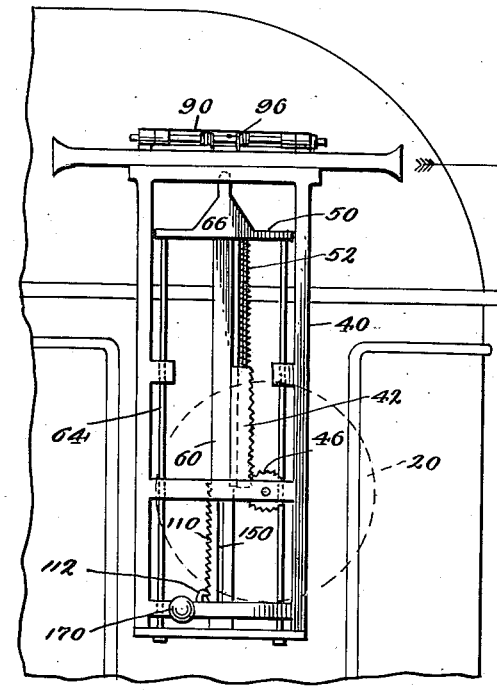
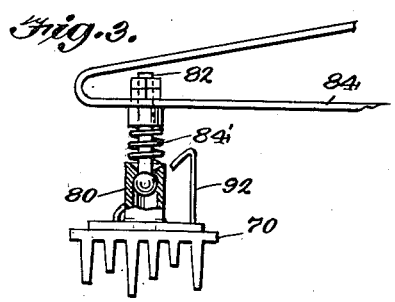
Fig. 3.
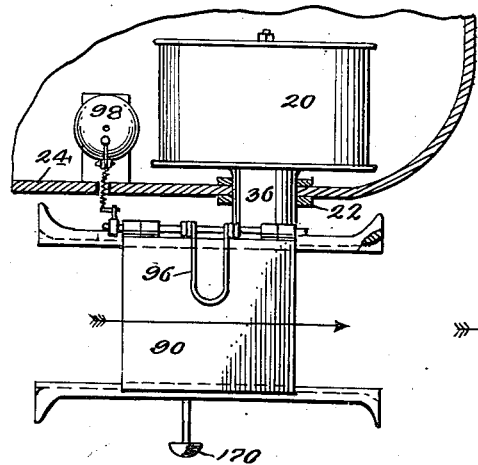
Fig. 2.
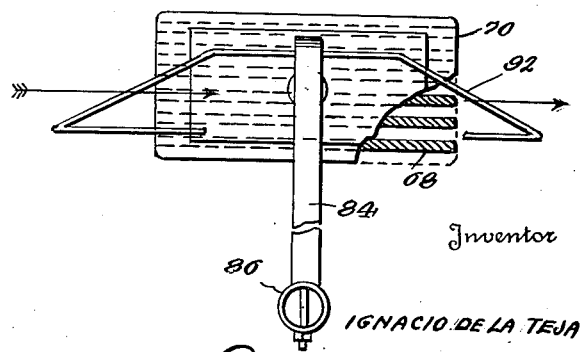
Inventor
IGNACIO DE LA TEJA
By L. Edw. Daherty
Attorney

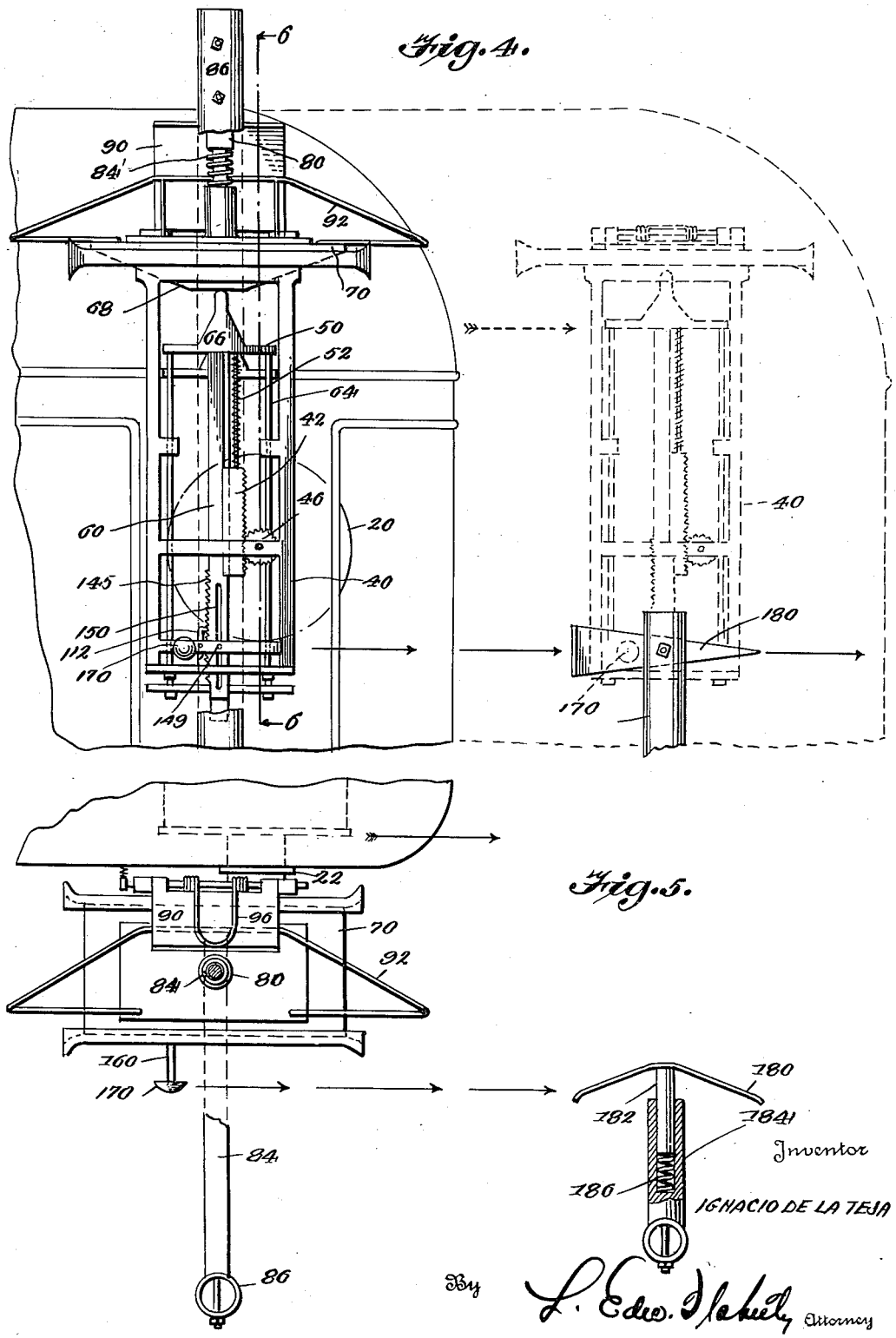

July 7, 1936.    I. DE LA TEJA    2,046,552
INDICATOR
Filed April 16, 1934    4 Sheets-Sheet 3
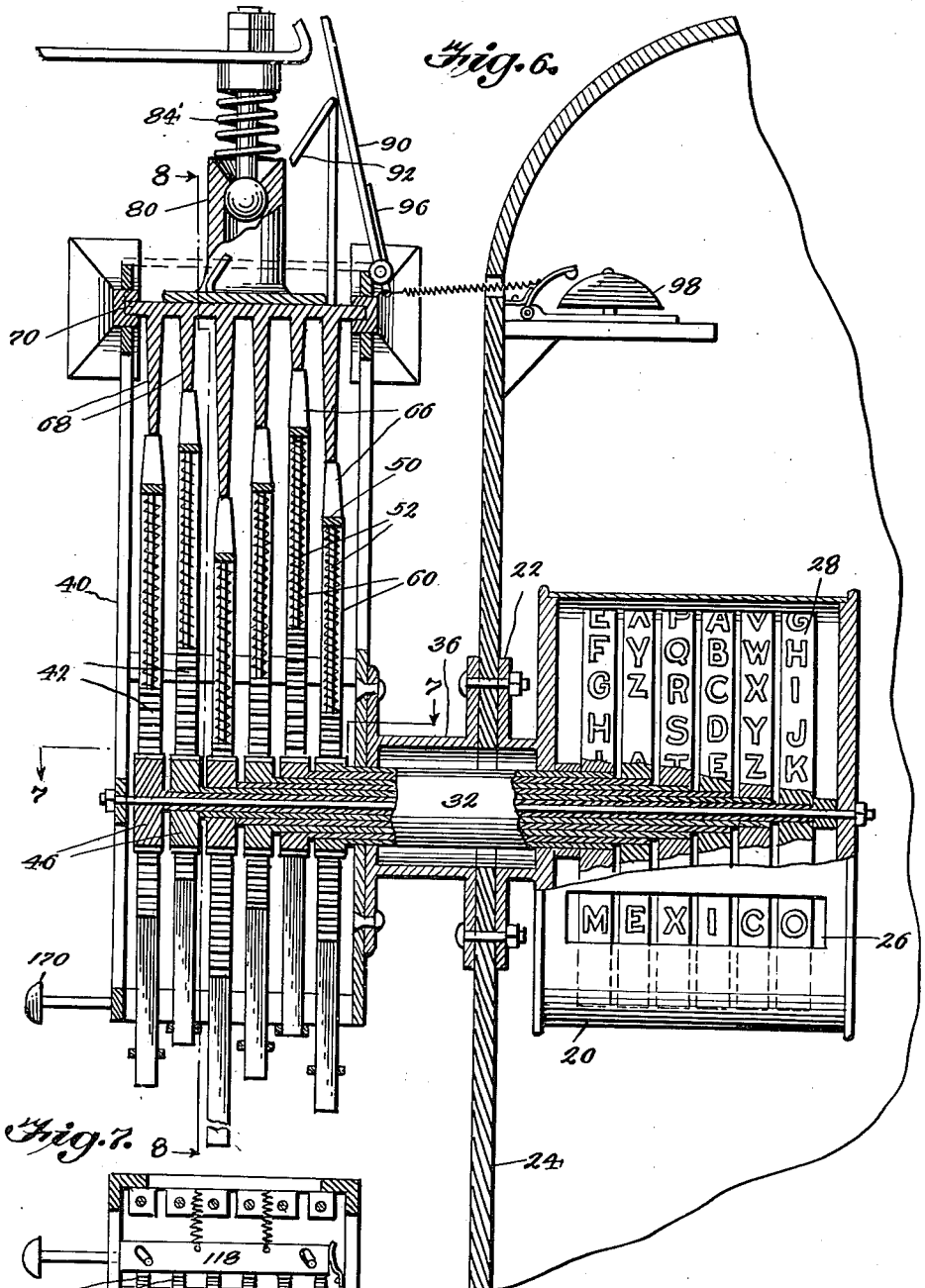
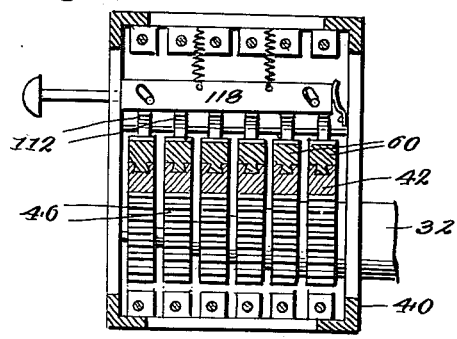
Inventor
IGNACIO DE LA TEJA July 7, 1936.     I. DE LA TEJA     2,046,552
INDICATOR
Filed April 16, 1934     4 Sheets-Sheet 4
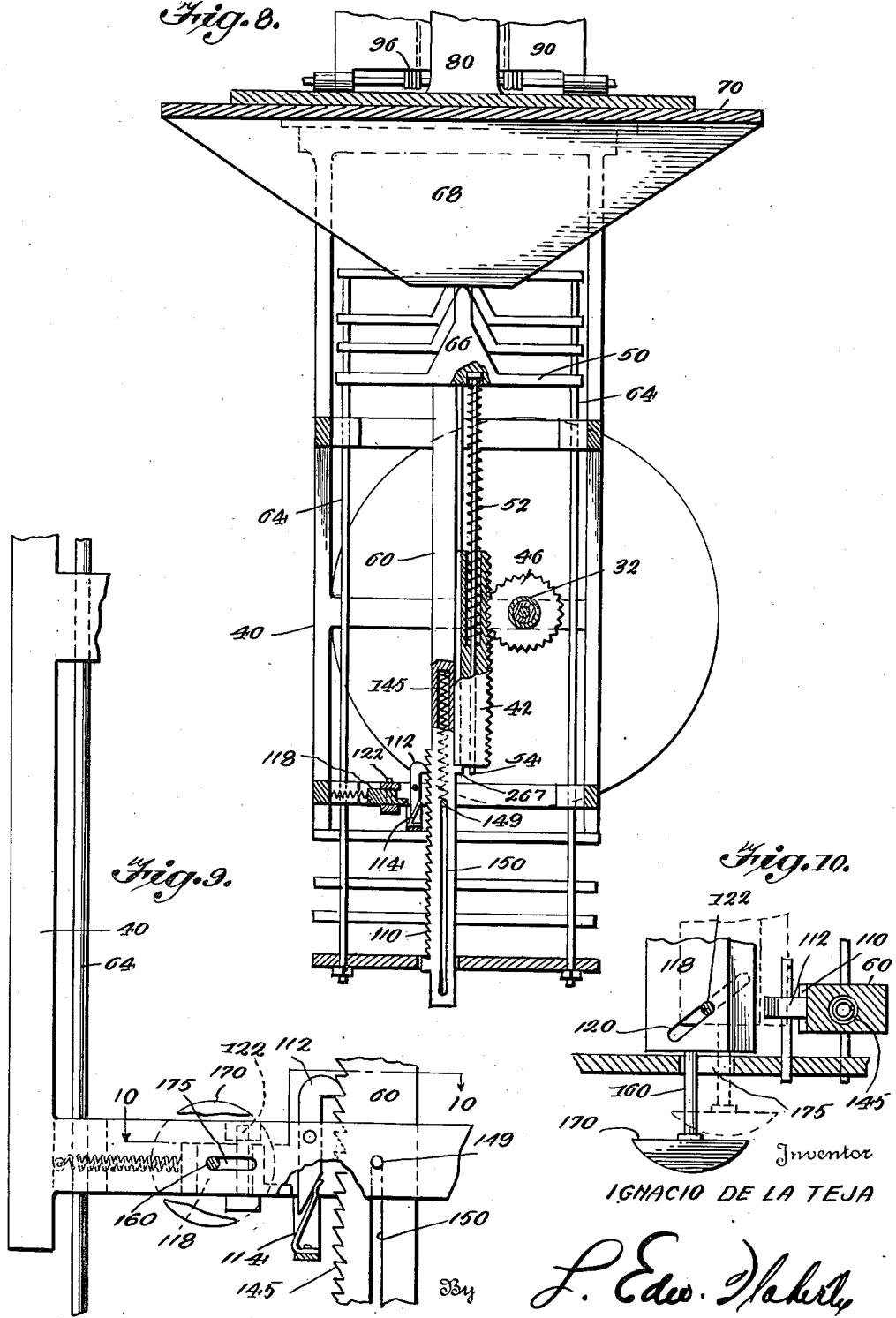
Inventor
IGNACIO DE LA TEJA Patented July 7, 1936

2,046,552

UNITED STATES PATENT OFFICE 2,046,552

INDICATOR

Ignacio de la Teja, Mexico, D. F., Mexico

Application April 16, 1934, Serial No. 720,876

9 Claims. (Cl. 40—45)

This invention relates to indicators or signalling devices especially adapted for use on vehicles which travel predetermined routes.

Briefly stated, one of the objects of the invention is to provide a visual indicator to apprise the occupant of a vehicle as to the name of the station or place being approached or being passed by a vehicle.

More particularly, the invention forming the subject of this application, contemplates the employment of a plurality of separately actuated discs or drums having the peripheral surfaces thereof provided with letters or other indicating means adapted to be brought into the position necessary to indicate to the occupant of the vehicle, the name of the place intended to be indicated and it will be found that an important part of the invention has reference to the means by which these discs or drums are actuated to arrange the same in a predetermined order and to return the same to a neutral position when the station or place has been passed.

The invention further aims to provide a station or place indicator which may be applied to a vehicle either during course of manufacture or at any time thereafter without elaborate changes in the design of the vehicle and without marring the appearance of the vehicle.

A further aim is to provide an indicator or signalling apparatus of the type described which is of highly simplified construction, neat in appearance and relatively cheap to manufacture.

Other objects and advantages will be apparent during the course of the following description.

In the accompanying drawings, forming a part of this application and in which like numerals are employed to designate like parts throughout the same, Figure 1 is a fragmentary side elevation illustrating the application of the improved signal, the actuating means for the signal being also shown, Figure 2 is a fragmentary plan view of the structure shown in Fig. 1, a portion of the same being shown in section, Figure 3 is a detail transverse sectional view illustrating the actuating means for the signal, Figure 4 is a side elevation illustrating the signal actuator and the signal in interfitting or co-operating relation, the view also illustrating the releasing mechanism arranged in advance of the signal, Figure 5 is a fragmentary plan view of the structure shown in Fig. 4, Figure 6 is a vertical transverse sectional view through the signal, the view being taken on line 6—6 of Figure 4, Figure 7 is a horizontal sectional view taken on line 7—7 of Figure 6, Figure 8 is a vertical sectional view taken on line 8—8 of Figure 6, Figure 9 is an enlarged detail sectional view illustrating the means by which the various movable elements are detachably held in advanced position and are subsequently released, Figure 10 is a detail sectional view taken on line 10—10 of Figure 9.

In opening the description, attention is invited to Figure 6, in which there is illustrated a more or less cylindrical casing 20 having an attaching flange 22 secured to a support 24 such, for example, one wall of the car.

In carrying out the invention, the cylindrical casing 20 is formed at a conspicuous and fully visible point with a sight opening or window 26 affording a view of the indicia on the peripheral portion of a plurality of selectively and independently turned discs or drums 28. That is to say, each disc 28 is provided, in this case, with an annular series of letters and of course, there are combinations of the letters on the aligned disc which spell the name of stations, stops or places through which the vehicle passes. It is believed to be apparent that by the selective turning of the disc 28, the names of the various stations or places will appear in the window 26 providing a means by which the passengers of the vehicle are duly apprised as to the progress of the vehicle and the approaching stops or the places thru which the vehicle is passing.

It is further illustrated in Figure 6 that what might be said to be the inner end of the drum 20 forms a bearing for the outermost of a plurality of interfitting, independently rotatable sleeves 32, the outermost sleeve 32 being the shortest and being connected in any suitable manner to the nearest disc or indicating element 28 while the remaining sleeve progressively increases in length toward the inner-most sleeve with one sleeve connected to the associated disc. It is believed to be apparent that by independent turning of the various sleeves 32, the discs 28 will be similarly turned in the proper order, each independent of the other to spell the desired name in the window 26. Immediately outside of the support 24 in axial alignment with the bearing for the sleeve 32 there is a second tubular bearing 36 forming a support for the outer portions of the sleeves and at the same time forming a support for a supporting frame 40.

It is further illustrated in Figure 6, that the frame 40 constitutes a support for a plurality of sleeve actuating devices comprising, in part, a plurality of separately actuated racks 42 having teeth in constant mesh with the teeth of spur gears 46.

It is illustrated in Figure 6 that the outer portions of the sleeves 32 are arranged in stepped relation, one slightly beyond the other affording attaching areas for the spur gears 46. Of course, the spur gears 46 are keyed or otherwise rigidly secured to the outer portions of the sleeves 32 so that the motion imparted to the spur gears 46 through reciprocation of the rack 42 results in rotation of the sleeves 32. The extent of rotation of the sleeves 32 depends upon the longitudinal movement of the racks 42.

In Figures 6 and 8 it is clearly illustrated that the racks 42 are located directly below the head 50 and that expansion springs 52 are confined between the heads 50 and abutting surfaces of the racks 42. By this arrangement, when the heads 50 are depressed, the springs 52 will be loaded to a point sufficient to turn the spur gears 46 the desired extent. The several expansion springs 52 provide a yieldable means for transmitting motion between the heads 50 and the spur gears 46 so that stripping of the teeth is avoided and at the same time the several sleeves 32 and the associated discs 29 are turned easily to the required point.

It is clearly illustrated in Figure 8 that the several expansion springs 52 are held against collapsing or against lateral distortion by the guide stems 54 shown to be passed through the springs. The guide stems 54 are connected to the heads 50 and are slidably extended through the racks 42 for the full length thereof.

By reference to Figures 7 and 8 it will be seen that the racks 42 have what might be said to be the rear surfaces thereof dove-tailed for the full length thereof with depending spindles 60. That is to say, there is a slidable depending connection between the racks 42 and the associated spindles 60 allowing the spindles 60 to be operated independently of the racks and vice versa.

Returning to the heads 50 it is pointed out that the same have the end portions thereof rigidly connected to depending guide stems 64 slidable thru vertically spaced portions of the frame so that the heads are held in predetermined position for vertical movement. It is shown in Fig. 8 that the heads 50 are provided between the ends thereof with tapered contact elements 66 adapted for engagement by the depending flanges or lobes 68 of a signal actuating member 70.

By reference to Figure 1, it will be seen that the signal actuating member 70 and the depending flanges or lobes 68 thereof are located directly in the path of travel of the contact elements 66 and that the end portions and more particularly the approach end portions of the flanges 68 are provided with inclined surfaces for engagement with the contact elements 66. By this arrangement, the inclined or oblique ends of the flanges 68 will gradually depress the heads 50 without damage to the contact elements 66.

By the same token, as the contact elements 66 ride beneath the lower edges of the lobes or cams 68, the same will come into engagement with the angled ends of the rear sides of the lobes 68 so that the heads 50 are allowed to ascend without the abruptness which might result in destruction of one or more of the parts.

As previously stated, the signal actuator 70 occupies a fixed position at some place along the route of the vehicle so as to bring about the selective actuation of the disc 28 to produce the name of the station or town in the window 26. This makes it necessary to have the depending flanges 68 of varying depths, some deeper than others to depress the heads 50 different distances.

It is believed to be clear that the extent to which the heads 50 are depressed determines the extent to which the spur gears 46 are turned and consequently the extent of turning of the disc 28. Thus, to produce a certain combination of letters in the window 26 it is merely necessary to have a predetermined arrangement of the flanges 68.

The signal actuator 70 embodies a header suspended from what might be said to be a boss 80 within which there is a ball and socket joint. It is shown in Figure 3, that a shank or attaching bar 82 extends upward from the ball and socket joint and is rigidly attached to the laterally projecting arm 84 of a fixed support 86. The ball and joint connection provides a limited and swivelly action necessary to adapt the signal actuator 70 to the signal after the fashion shown in Figure 1.

A spring 84' of the expansion type is shown to be mounted on the shank between the boss 80 and a nut or other member immediately beneath the arm 84 and provides for the tensioning of the ball and socket joint so that the signal operator 70 will be held in the desired position with the firmness necessary.

Referring now to Figures 1 and 2, it will be seen that the top or upper end of the frame 40 is provided with a cover plate 90 protecting the parts below against rain and the like, and as this cover plate approaches the signal 70 it is engaged by a wedge-shaped element 92. The function of the tapered member 92 is to engage the under side of the cover plate 90 and lift the same upon its hinge, so as to allow of the desired engagement between the elements 66 and 68 without interference by the cover plate.

When the signal 40 carried by the vehicle passes beyond the range of the member 92, the cover plate 90 is returned to its closed position by the springs 96.

Incidentally, it is shown in Figure 2, that a bell 98 is associated with the cover plate or the hinge thereof and has a motion transmitting connection therewith providing a means by which the bell is pounded on each occasion of the operation of the cover plate 90.

Attention is invited to Figure 8 in which it is illustrated that each spindle 60 is rigidly suspended from the associated head 50 and is provided at one side with a plurality of ratchet teeth 110 adapted for engagement by the teeth of pivoted pawls 112. The pawls 112 are pivotally mounted between the ends thereof and at the lower portions are engaged by springs 114 affording a means by which the teeth of the pawls are urged into locking engagement with the teeth of the associated spindles or rack bars 60. Thus, when the heads 50 are depressed in the manner previously described, the same are held in this position until intentionally released. In other words, when the ratchet bars 60 are moved downward to the position suggested in Figure 8, the same are held against return to the upper position by the pawls 112. By this arrangement, the name appearing in the window 26 will remain until the station has been passed.

When the station or point to be indicated has been passed, a releasing bar 118 is brought into play. This bar is arranged in back and adjacent the lower portions of the pivoted pawls 112 and is movable longitudinally and laterally so as to rock the pawls out of restraining engagement with the ratchet teeth 110.

It is clearly illustrated in Figure 8 that each ratchet bar 60 is provided with a laterally projecting lug 267 adapted to engage the lower end of the associated rack bar 42 so as to return the same to an elevated position. That is to say, when a particular ratchet bar 60 is returned to the elevated position disclosed in Figure 1, the lug 257 will engage the lower end of the associated rack bar 42 and thus return the rack bar to its elevated position.

It is clearly shown in Figure 10 that the releasing bar 118 is provided with one or more diagonal slots 120 receiving fixed pins 122 so that when endwise pressure is applied to the releasing bar 118 it is moved endwise and laterally into rocking engagement with the pawls 112. Thus, the pawls 112 are all released simultaneously so as to allow of the simultaneous return of the ratchet bars 60 and the associated heads 50 to the elevated position suggested in Figure 1.

In Figure 8 it is illustrated that an expansion spring 145 is associated with each ratchet bar 60 and provides a means by which, upon the release of the various ratchet bars, the same are returned to the elevated position suggested in Figure 1. The expansion springs 145 are shown to be mounted in longitudinally extending sockets in the ratchet bars 60 and have the lower ends thereof in engagement with the pins 149, these pins being rigidly carried by the frame 40.

Figure 8 further illustrates that the pins 149 are operable in slots 150 in the lower portions of the ratchet bars 60.

Attention is now invited to Figure 10 in which it is illustrated that the releasing bar 118 is provided with a shank 160 having a knob or head 170 adapted to be moved endwise and laterally after the fashion shown in dotted lines in Figure 10.

A slot 175 in the frame allows of the longitudinal and transverse movement of the shank 160.

Referring now to Figure 5, it is illustrated that the head 170 is adapted to be brought into contact with a releasing element 180 located at an appropriate point in the line of travel of the vehicle. In Figure 5 the element 180 is shown to be inclined and at an angle to the path of travel of the head 170 so as to gradually move in with the head.

It is further shown in Figure 5 that the element 180 is provided with an attaching stem or shank 182 mounted movably in a socket member 184. A spring 186 backs up the shank 182 and is, of course, yieldable for the purpose of allowing the element 180 to recede slightly upon being encountered by the head 170.

With reference to the foregoing description taken in connection with the foregoing drawings, it will be apparent that the herein disclosed signalling mechanism provides a means by which the occupants of a motor vehicle are duly apprized of approaching or reaching a predetermined point in the path of travel of the vehicle so that such passengers of the vehicle may arrange to leave the vehicle or will be duly notified of the various points of interest which they are passing.

It is to be understood that the form of invention herewith shown and described is to be taken as a preferred example of the same, and that such minor changes in arrangement and construction of parts may be made as will remain within the spirit of the invention and the scope of what is claimed.

Having thus described the invention what is claimed is:

1. In a signal of the class described, a casing having a window, a plurality of separate discs having peripheral indicating means adapted to be selectively presented in said window, and supporting sleeves having the end portions thereof stepped progressively, one beyond the other and in supporting relation to said discs, said casing being provided with a bearing for said sleeves, actuating means engaged with said sleeves, independent racks engaged with said actuating means, and means for selectively depressing said racks including a stationary member having a plurality of spaced depending cams of varying depths.

2. In a signal of the class described, a frame, a plurality of vertically movable racks carried by the frame, heads for the racks, expansion cushioning springs between the heads and the racks, signalling elements actuated by the racks, means for selectively depressing the heads, and guide means for said means selectively depressing the heads.

3. In a signal of the class described, a frame, a plurality of vertically movable racks carried by the frame, heads for the racks, expansion springs between the heads and the racks, signalling elements actuated by the racks, and means for selectively depressing the heads, stems carried by the end portions of the heads, said frame being provided with bearings slidably receiving the stems.

4. In a signal of the class described, a frame, a plurality of vertically movable racks carried by the frame, heads for the racks, expansion springs between the heads and the racks, signalling elements actuated by the racks, means for selectively depressing the heads, ratchet bars depending from said heads and rigidly attached thereto, there being a dove-tail connection between said racks and said ratchet bars.

5. In a signal of the class described, a frame, a plurality of vertically movable racks carried by the frame, heads for the racks, expansion springs between the heads and the racks, signalling elements actuated by the racks, means for selectively depressing the heads, ratchet bars depending from said heads and rigidly attached thereto, there being a dove-tail connection between said racks and said ratchet bars, and spring means associated with the ratchet bars to return the same independently to elevated positions.

6. In a signal of the class described, a frame, a plurality of vertically movable racks carried by the frame, heads for the racks, expansion springs between the heads and the racks, signalling elements actuated by the racks, means for selectively depressing the heads, ratchet bars depending from said heads and rigidly attached thereto, there being a dove-tail connection between said racks and said ratchet bars, spring means associated with the ratchet bars to return the same independently to elevated positions, spring actuated pawls engaging said ratchet bars.

7. In a signal of the class described, a frame, a plurality of vertically movable racks carried by the frame, heads for the racks, expansion springs between the heads and the racks, signalling elements actuated by the racks, means for selectively depressing the heads, ratchet bars depending from said heads and rigidly attached thereto, there being a dove-tail connection between said racks and said ratchet bars, spring means associated with the ratchet bars to return the same independently to elevated positions, spring actuated pawls engaging said ratchet bars, means for simultaneously engaging and releasing said pawls, said ratchet bars being provided with lugs in motion transmitting engagement with said racks.

8. In a mechanism of the class described, a plurality of elements, a frame slidably supporting the elements, an actuator having means to depress said elements, guide means for said actuators, a cover plate for said elements and means associated with said actuator to swing said cover plate to a predetermined position.

9. In a mechanism of the class described, a plurality of elements, a frame slidably supporting the elements, actuators having means to depress said elements, a cover plate for said elements, and means associated wtih said actuator to swing said cover plate to a predetermined position.

IGNACIO DE LA TEJA.